E. J. KELLY.
PIPE COUPLING.
APPLICATION FILED APR. 15, 1913.
1,072,736.
Patented Sept. 9, 1913.
2 SHEETS—SHEET 1.
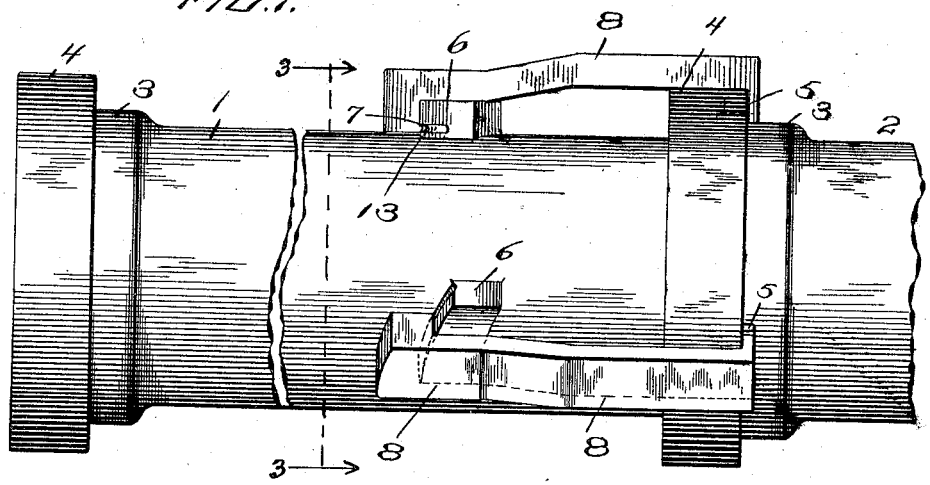
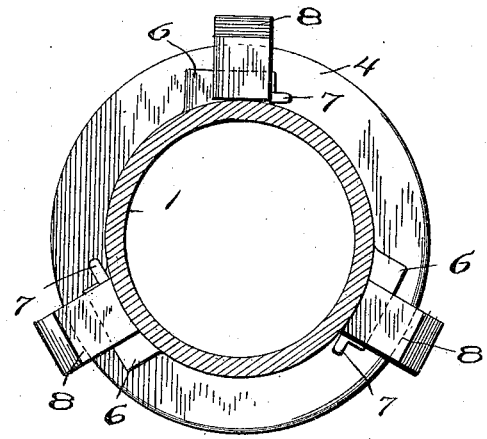
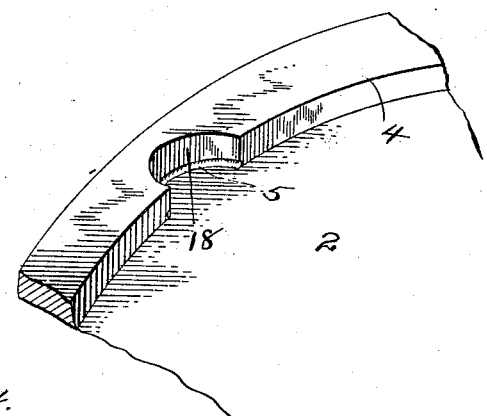
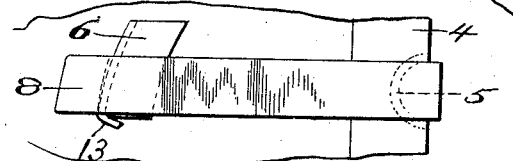
Witnesses
Inventor
Eugene J. Kelly
John A. Saul
Attorneys E. J. KELLY.
PIPE COUPLING.
APPLICATION FILED APR. 15, 1913.
1,072,736.
Patented Sept. 9, 1913.
2 SHEETS—SHEET 2.
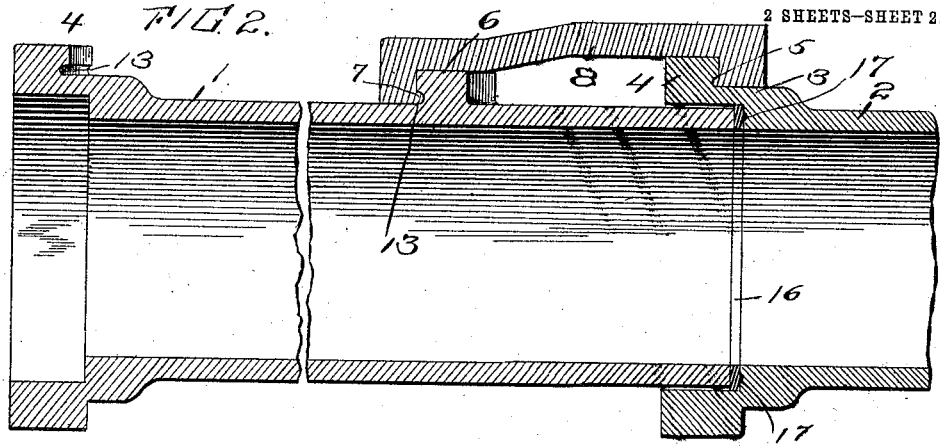
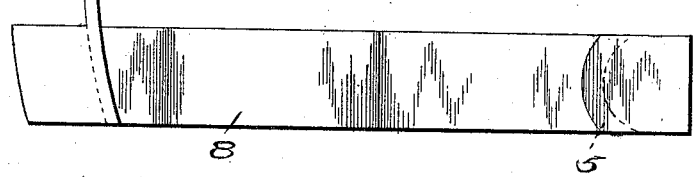
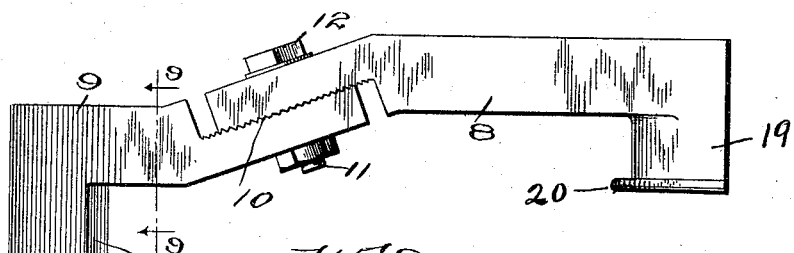
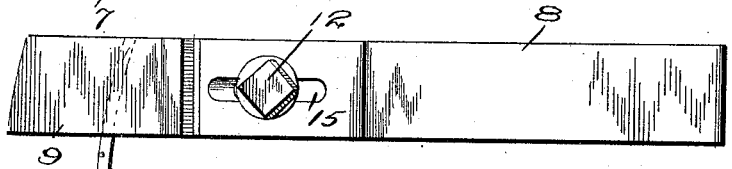
Witnesses
R. S. Progner.
M. V. Simms.
Inventor
Eugene J. Kelly
John A. Saul
By
Attorneys

UNITED STATES PATENT OFFICE.

EUGENE J. KELLY, OF WASHINGTON, DISTRICT OF COLUMBIA.

PIPE-COUPLING.

1,072,736.  Specification of Letters Patent.  Patented Sept. 9, 1913.

Application filed April 15, 1913. Serial No. 761,219.

*To all whom it may concern:*

Be it known that I, EUGENE J. KELLY, a citizen of the United States, residing at Washington city, in the District of Columbia, have invented certain new and useful Improvements in Pipe-Couplers, of which the following is a specification.

My invention relates to pipe-couplers, for use in coupling all kinds of pipes either exposed or underground; and more particularly to connect pipes where a close union, strength and lasting qualities are desired, such as gas, water pipes, and the like.

The object of the invention is to construct a coupler that may be easily and cheaply manufactured, will be durable, the parts thereof may be separately made, may be easily replaced when worn; may be assembled with little effort; and will be absolutely impervious and prevent any leakage.

In the drawings forming a part of this specification, and in which like symbols of reference represent corresponding parts in the several views:—Figure 1 is a section of pipe with my invention applied thereto; Fig. 2 is a longitudinal section to show the connection of the parts; Fig. 3 is a transverse view, on the line 3—3, Fig. 1, looking in the direction of the arrows; Fig. 4 is a plan view of the one of the clamps; Fig. 5 is an inverted view of the connecting arm or clamp; Fig. 6 is a view of the arc-shaped recess formed in the head of the outer section; Fig. 7 is a modified form of clamp, showing the same adjustable; Fig. 8 is a plan view of the modification; and Fig. 9 is a view of the modification, transverse to Fig. 7, on line 9—9, looking in the direction of arrow.

The numeral 1 denotes one section of pipe and 2 the other.

3 is a collar, having a shoulder 4, in which a series of arc-shaped recesses 18 are cast or formed; and 5 is a recess formed at the base of the arc-shaped recess.

6 are curved lugs formed on the section 1, the same having recesses at their bases, said recesses being on the outer face of the same.

7 are tongues or arms formed on clamps 8, the object of the same being to take into the recesses on the lugs 6.

19 are lugs on clamps 8, the same having lips 20 to be received in the recesses 5.

9 is an adjustable section on the arm 8, the purpose of the same being to adjust said arm when necessary to conform to pipe; but as the same would seldom be required I merely show it as a modification and possible expedient.

10 are the ratchets to hold the parts when adjusted; 12 a bolt; and 11 a nut to hold the same.

14 is a corrugated surface or ratchet, shown as a modification on the part 9 so as to engage and hold the same against the lugs; but the same not being necessary is not generally used.

13 shows the end of the tongue 7 struck down after the parts are in operative position.

15 is a slot formed in arm 8 to permit adjustment of parts; 16 is a ring or gasket at the ends of the pipe sections; and 17 is a circumferential groove in the outer pipe section so that the gasket being forced against the same makes a more perfect union.

The operation of the coupling will be apparent from the foregoing. The arms or clamps are cast or formed separately; the pipe sections are formed with the lugs and recesses in the same; and a gasket is placed between the sections. The arms are then placed in position and driven home with a hammer or other instrument, and the lip 7 struck down firmly locking the same. For a four-inch pipe three braces are usually preferred; but for a larger pipe of course more are better.

Having now fully described my invention, what I claim as new and desire to secure by Letters-Patent, is:—

1. The combination with sections of a pipe, one section formed with pivotal recesses and the other section with inclined lugs, of clamps to engage the recesses and be swung over the lugs to draw the sections together and secure them in position.

2. The combination with sections of a pipe, one section formed with pivotal recesses and the other section with inclined lugs, of clamps to engage the recesses and be swung over the lugs to draw the sections together, and a tongue on the clamps to engage the inclined lugs and be struck down and lock the sections together.

3. A pipe coupling, comprising a section formed with pivotal recesses, a second section formed with inclined and undercut lugs, and clamps adapted to engage the recesses and be swung over the lugs, so as to draw said sections together and hold the same.

4. The combination with the sections of a pipe, one section formed with pivotal recesses undercut at their bases and the other section with inclined lugs undercut at their bases, of clamps having lugs formed with flanges to engage the undercut portion of the recesses and be swung over the lugs and engage the undercut recess of the same so that the sections of pipe may be drawn together and secured in position.

5. The combination with the sections of a pipe, one section formed with pivotal recesses undercut at their bases and the other section with inclined lugs undercut at their bases, of adjustable clamps havings lugs formed with flanges to engage the undercut portion of the recesses and be swung over the lugs and engage the undercut recesses of the same, and a gasket between the pipe sections, so that the sections may be drawn together and secured in position.

6. The combination with the sections of a pipe, one section formed with inclined lugs and the other section with pivotal recesses, of clamps formed with lugs adapted to engage the lugs and recesses of the pipe-sections, and a tongue formed on the lug-engaging section and adapted to be struck down to lock the parts when brought together.

In testimony whereof I affix my signature in presence of two witnesses.

EUGENE J. KELLY.

Witnesses:
J. Wm. Reily,
John Ridout.

---

Copies of this patent may be obtained for five cents each, by addressing the "Commissioner of Patents, Washington, D. C."